United States Patent
Nilsson (10) Patent No.: US 10,911,127 B2
(45) Date of Patent: Feb. 2, 2021

(54) BEAM MANAGEMENT OF A RADIO TRANSCEIVER DEVICE

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 383 days.

(21) Appl. No.: 15/751,762

(22) PCT Filed: Jan. 23, 2018

(86) PCT No.: PCT/EP2018/051511
§ 371 (c)(1),
(2) Date: Feb. 9, 2018

(87) PCT Pub. No.: WO2019/145012
PCT Pub. Date: Aug. 1, 2019

(65) Prior Publication Data
US 2020/0212986 A1 Jul. 2, 2020

(51) Int. Cl.
H04B 7/02 (2018.01)
H04B 7/08 (2006.01)
H04B 7/06 (2006.01)
H04B 7/10 (2017.01)
H04L 5/00 (2006.01)

(52) U.S. Cl.
CPC ......... *H04B 7/0695* (2013.01); *H04B 7/0894* (2013.01); *H04B 7/10* (2013.01); *H04L 5/0005* (2013.01); *H04L 5/0048* (2013.01)

(58) Field of Classification Search
CPC ...... H04B 7/0695; H04B 7/0894; H04B 7/10; H04L 5/0005; H04L 5/004824
USPC .................. 375/267, 299, 347; 455/101, 132
See application file for complete search history.

(56) References Cited

U.S. PATENT DOCUMENTS

| | | | |
|---|---|---|---|
| 2006/0035605 A1 | 2/2006 | Ozluturk et al. |
| 2008/0232502 A1 | 9/2008 | Wild et al. |
| 2015/0333885 A1 | 11/2015 | Athley |
| 2017/0078013 A1 | 3/2017 | Sanderovich et al. |

(Continued)

FOREIGN PATENT DOCUMENTS

WO 2018130281 A1 7/2018

OTHER PUBLICATIONS

Tateishi, K., et al., "Indoor Experiment on 5G Radio Access Using Beam Tracking at 15 GHz Band in Small Cell Environment," IEEE 27th Annual International Symposium on Personal, Indoor, and Mobile Radio Communications (PIMRC) Sep. 4-8, 2016, 6 pages.

(Continued)

*Primary Examiner* — Tesfaldet Bocure
(74) *Attorney, Agent, or Firm* — Sage Patent Group (57) ABSTRACT

There is provided mechanisms for participating in beam management. A method is performed by a radio transceiver device. The method comprises receiving a reference signal from another radio transceiver device as part of participating in the beam management. The reference signal occupies time/frequency resources that extend over a first frequency interval. The reference signal is received in a reception beam. The reception beam has a frequency-dependent polarization over the first frequency interval.

20 Claims, 5 Drawing Sheets

(56) References Cited

U.S. PATENT DOCUMENTS

| | | | |
|---|---|---|---|
| 2017/0338874 A1 | 11/2017 | Pratt et al. | |
| 2017/0353210 A1* | 12/2017 | Pratt | H04L 1/00 |
| 2019/0312628 A1* | 10/2019 | Bergstrom | H04B 7/086 |
| 2019/0356378 A1* | 11/2019 | Takeda | H04L 5/10 |
| 2019/0364546 A1* | 11/2019 | Kwak | H04W 72/042 |
| 2019/0386733 A1* | 12/2019 | Nilsson | H04B 7/088 |
| 2020/0083938 A1* | 3/2020 | Park | H04L 27/2636 |

OTHER PUBLICATIONS

International Search Report and Written Opinion of the International Searching Authority, PCT/EP2018/051511, dated Oct. 11, 2018, 23 pages.

* cited by examiner

Fig. 1

| Reference # | Description |
|---|---|
| 100 | Communications Network |
| 110 | Radio Access Network |
| 120 | Core Network |
| 130 | Service Network |
| 140, 140a, 140b | Beams |
| 150, 150a, 150b | Beams |
| 200a | Radio Transceiver Device |
| 200b | Radio Transceiver Device |
| 400a | Transmission Reception Point (TRP) |
| 400b | Transmission Reception Point (TRP) |

BEAM MANAGEMENT OF A RADIO TRANSCEIVER DEVICE

CROSS REFERENCE TO RELATED APPLICATIONS

This application is a 35 U.S.C. § 371 national stage application of PCT International Application No. PCT/EP2018/051511 filed on Jan. 23, 2018, the disclosure and content of which is incorporated by reference herein in its entirety.

TECHNICAL FIELD

Embodiments presented herein relate to a method, a radio transceiver device, a computer program, and a computer program product for participating in beam management.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS), used for beam management.

The reference signals for beam management can be transmitted periodically, semi-persistently or aperiodic (event triggered) and they can be either shared between multiple terminal devices or be device-specific. In order for the terminal device to find a suitable network node beam, the network node transmits the reference signal in different transmission (TX) beams on which the terminal device performs measurements, such as reference signal received power (RSRP), and reports back the N best TX beams (where N can be configured by the network). It is expected that different TX beams are transmitted in different reference signal resources (where each resource is defined in a time/frequency-grid, and that the terminal device reports back N resource indicators, such as CSI-RS resource indicators (CRIs), to inform the network node which TX beams are best. Furthermore, the transmission of the reference signal on a given TX beam can be repeated to allow the terminal device to evaluate a suitable reception (RX) beam.

Taking CSI-RS as an example, the CSI-RS resources used for beam management might consist either of one or two CSI-RS ports. One benefit with using two-port CSI-RS resources is that one CSI-RS port can be transmitted per polarization, which means that the terminal device can measure average RSRP over two orthogonal polarizations and hence reduce the risk of polarization mismatch. One reason for using single port CSI-RS resources for beam management is for example that CSI-RS for so-called layer three ($L_3$) mobility is currently only agreed for one-port CSI-RS and overhead can be reduced if these CSI-RS are reused also for beam management purposes. Also synchronization signal (SS) blocks that are transmitted periodically has been agreed to be used for beam management, and SS blocks only consist of one port.

For terminal devices, the incoming signals can arrive from all different directions. Hence it might be beneficial to have an antenna configuration at the terminal device which has the possibility to generate omni-directional-like coverage in addition to the high gain narrow beams. However, for antenna arrays with single polarized antenna elements (and an analog distribution network) it might be difficult to generate beams with a large variety in beamwidth. Hence, antenna arrays with dual-polarized elements might preferred such that dual-polarized beamforming can be used to generate beams with any beamwidth, ranging from the beamwidth of a single antenna element to the beamwidth of the entire antenna array.

One issue with using dual-polarized beamforming, where both polarization ports are used to create a port (i.e., one port for both polarizations), for an analog antenna array is that the resulting beam will only have one distinct polarization in each direction, which means that polarization mismatch can occur between the transmitter and receiver, which can deteriorate the link significantly.

Hence, there is still a need for an improved beam management.

SUMMARY

An object of embodiments herein is to provide efficient beam management where the above noted issues are resolved, or at least mitigated.

According to a first aspect there is presented a method for participating in beam management. The method is performed by a radio transceiver device. The method comprises receiving a reference signal from another radio transceiver device as part of participating in the beam management. The reference signal occupies time/frequency resources that extend over a first frequency interval. The reference signal is received in a reception beam. The reception beam has a frequency-dependent polarization over the first frequency interval.

According to a second aspect there is presented a radio transceiver device for participating in beam management. The radio transceiver device comprises processing circuitry. The processing circuitry is configured to cause the radio transceiver device to receive a reference signal from another radio transceiver device as part of participating in the beam management. The reference signal occupies time/frequency resources that extend over a first frequency interval. The reference signal is received in a reception beam. The reception beam has a frequency-dependent polarization over the first frequency interval.

According to a third aspect there is presented a radio transceiver device for participating in beam management. The radio transceiver device comprises a receive module configured to receive a reference signal from another radio transceiver device as part of participating in the beam management. The reference signal occupies time/frequency resources that extend over a first frequency interval. The reference signal is received in a reception beam. The reception beam has a frequency-dependent polarization over the first frequency interval.

According to a fourth aspect there is presented a computer program for participating in beam management, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient beam management which does not suffer from the above noted issues.

Advantageously this enables polarization diversity to be attained during reception of reference signals used for beam management. Advantageously, this will increase the chance of the radio transceiver device selecting the true best transmission beam.

Advantageously this enables a preferred polarization setting for the radio transceiver device to be attained. Advantageously, this will increase the performance (such as resulting in higher throughput and/or higher signal to noise ratio) of coming data communications.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
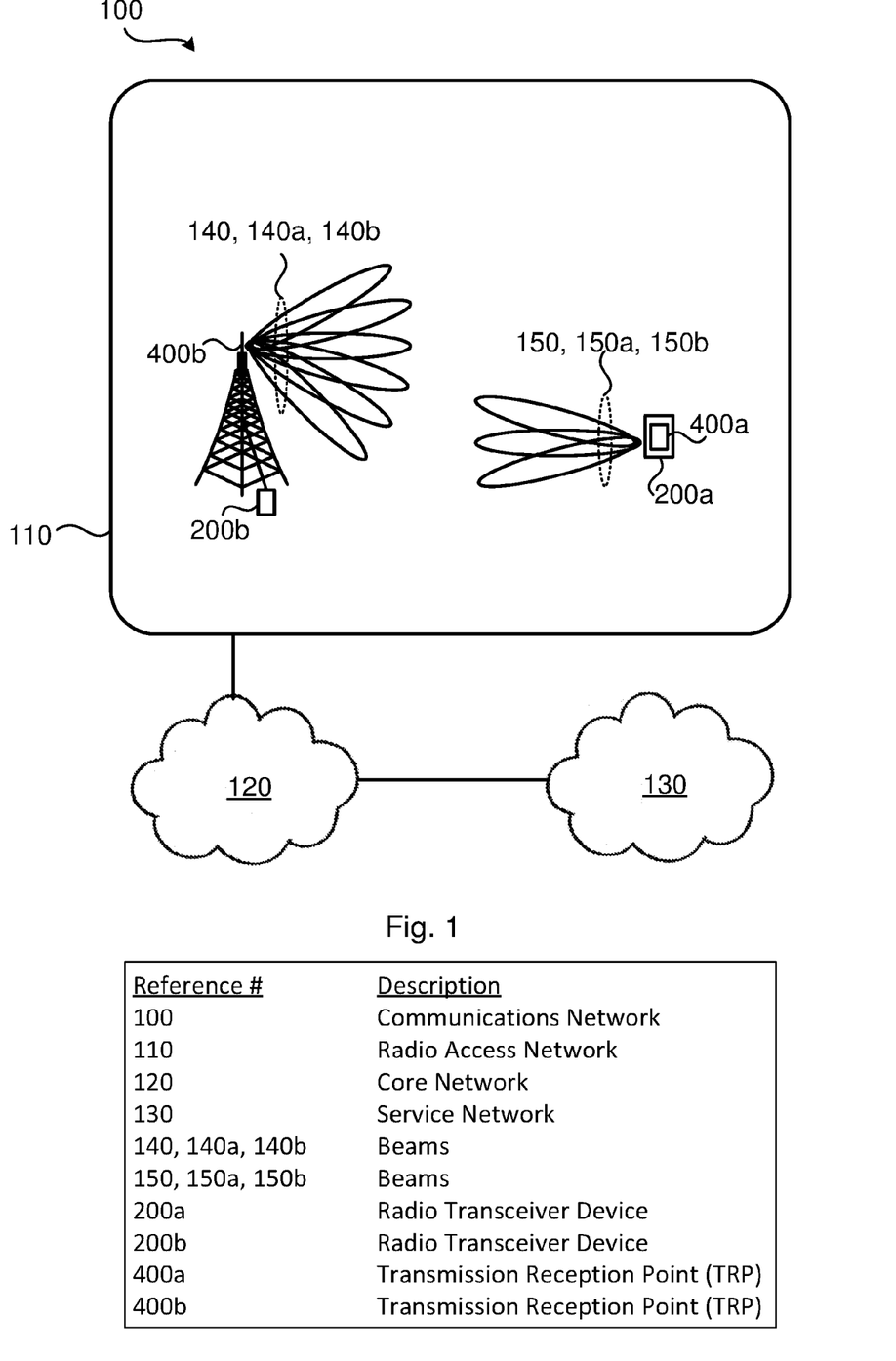
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio transceiver device 200b configured to, via TRP 400b, provide network access to radio transceiver device 200a, comprising TRP 400a, in a radio access network no. In some embodiments radio transceiver device 200a is part of, integrated with, or collocated with, a terminal device and radio transceiver device 200a is part of, integrated with, or collocated with, a network node.

Radio access network 110 is operatively connected to a core network 120. The core network 120 is in turn operatively connected to a service network 130, such as the Internet. Radio transceiver device 200a is thereby, via the TRP 400b and radio transceiver device 200a, enabled to access services of, and exchange data with, the service network 130.

Examples of network nodes are radio access network nodes, radio base stations, base transceiver stations, Node Bs, evolved Node Bs, g Node Bs, access points, access nodes, and backhaul nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a radio transceiver device implemented both as a radio access network node and a terminal device, or even as a radio transceiver device implemented as a backhauling node or a sidelink node. Thus, although radio transceiver device 200b in at least some of the herein disclosed embodiments is described as being a network node and radio transceiver device 200a is described as being a terminal device, the functionality of the herein disclosed radio transceiver device 200b could equally be implemented in a terminal device, and vice versa for radio transceiver device 200a.

Radio transceiver device 200a is, via TRP 400a, configured to communicate with radio transceiver device 200b in beams 150, 150a, 150b. Further, radio transceiver device 200b is, via TRP 400b, configured to communicate with radio transceiver device 200a in beams 140, 140a, 140b. Radio transceiver device 200a, 200b could be configured to communicate using a variety of beams having different shapes and widths, herein generally referred to as having different beam patterns.

As disclosed above a beam management procedure might be performed in order to find a BPL for radio transceiver device 200a and radio transceiver device 200b. As further disclosed above, the beam management procedure disclosed above might result in some issues.

In further detail, for some antenna array architectures only one polarization can be attained for the whole frequency band. This might be the case where the antenna array comprises analog phase shifters, which are wideband. One drawback with this is that, due to that only one polarization will be received, there is no information available regarding how good the other polarization is. In case the RSRP differs much between different polarizations, there is a risk that the beam management procedure results in selection of a sub-optimal BPL. Further in this respect, different polarizations might have different best transmission beams; for example, in non-line-of-sight (NLOS) scenarios, the transmission beam being measured as having highest RSRP in one polarization might be the weakest in the orthogonal polarization.

Still further, since the polarization state is wideband (i.e. the polarization is the same for the whole frequency interval) it will not be possible for radio transceiver device 200a to evaluate which polarization state that is preferred by only making measurements during reception of the reference signal in one single transmission beam.

The embodiments disclosed herein therefore relate to mechanisms for participating in beam management. In order to obtain such mechanisms there is provided a radio transceiver device 200a, a method performed by radio transceiver device 200a, a computer program product comprising code, for example in the form of a computer program, that when run on a radio transceiver device 200a, causes radio transceiver device 200a to perform the method.

In particular, there is proposed an architecture and method that enables radio transceiver device 200a to attain polarization diversity over the frequency band during beam management procedure in order to attain polarization diversity for beam selection and/or a preferred polarization setting for coming data transmission/reception.

Figure 2:
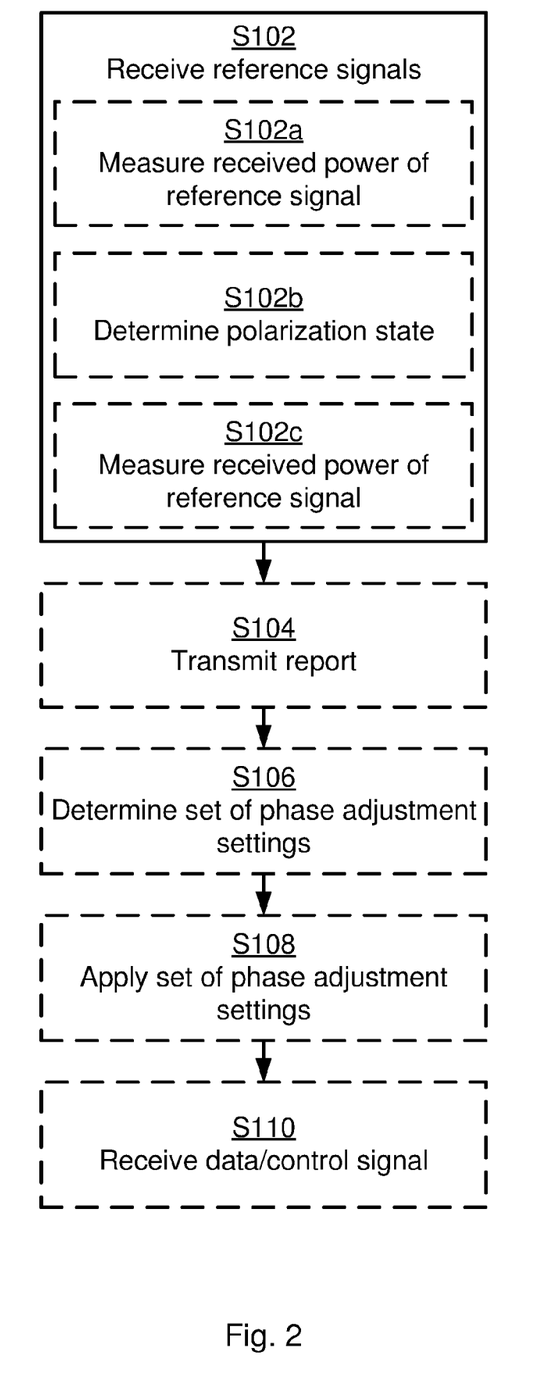
FIG. 2 is a flowchart of methods according to embodiments.

FIG. 2 is a flowchart illustrating embodiments of methods for participating in beam management. The methods are performed by radio transceiver device 200a. The methods are advantageously provided as computer programs 820.

The embodiments disclosed herein are based on changing the polarization for the receive beams, in which a reference signal is received, over the frequency band. Thus, radio transceiver device 200a is configured to perform step S102:

S102: Radio transceiver device 200a receives a reference signal from another radio transceiver device 200b as part of participating in the beam management.

The reference signal occupies time/frequency resources that extend over a first frequency interval. The reference signal is received in a reception beam 150, 150a, 150b. The reception beam 150, 150a, 150b has a frequency-dependent polarization over the first frequency interval.

This will create polarization diversity for the received reference signals used for the beam management procedure. This will increase the likelihood of radio transceiver device 200a selecting the best transmission beam as used by radio transceiver device 200b for transmitting the reference signal.

Embodiments relating to further details of participating in beam management as performed by radio transceiver device 200a will now be disclosed.

Due to that different polarizations, or polarization states, will be applied to different parts of the frequency band, it will be possible for radio transceiver device 200a to determine a preferred polarization state for coming data transmission/reception, by analyzing how the received power variates over frequency. In one embodiment radio transceiver device 200a thus additionally determines a preferred polarization state to be used during the coming data transmission/reception. This could be done by radio transceiver device 200a evaluating RSRP over the frequency band during the beam management procedure and find which parts of the frequency band that has the highest RSRP. Particularly, according to an embodiment radio transceiver device 200a is configured to perform (optional) steps S102a and S102b:

S102a: Radio transceiver device 200a measures received power of the reference signal over the first frequency interval when receiving the reference signal.

S102b: Radio transceiver device 200a determines at which frequency-dependent polarization in the first frequency interval the reference signal was received with highest received power.

Steps S102a and S102b might be performed as part of step S102.

Radio transceiver device 200a is able to determine which polarization state is used for which part of the frequency band since radio transceiver device 200 knows how much the polarization changes over the frequency interval). The preferred polarization state can then be applied for the whole frequency band during coming data transmission/reception by setting the appropriate phase of phase shifters.

In some aspects the beam management procedure involves radio transceiver device 200b to transmit the reference signal in two or more TX beams. Particularly, according to an embodiment at least two occurrence of the reference signal is received in the reception beam 150, 150a, 150b. Each occurrence corresponds to a different transmission beam 140, 140a, 140b in which the reference signal is transmitted from radio transceiver device 200b. According to this embodiment radio transceiver device 200a is configured to perform (optional) step S102C:

S102C: Radio transceiver device 200a measures received power of each occurrence of the reference signal over the first frequency interval when receiving the reference signal.

Step S102C might be performed as part of step S102.

In some aspects radio transceiver device 200a then reports back the N best transmission beams to radio transceiver device 200b, where N is configured by the network.

Particularly, according to an embodiment radio transceiver device 200a is configured to perform (optional) step S104:

S104: Radio transceiver device 200a transmits a report towards radio transceiver device 200b. The report indicates at least which occurrence of the reference signal was received with highest received power.

Figure 3:
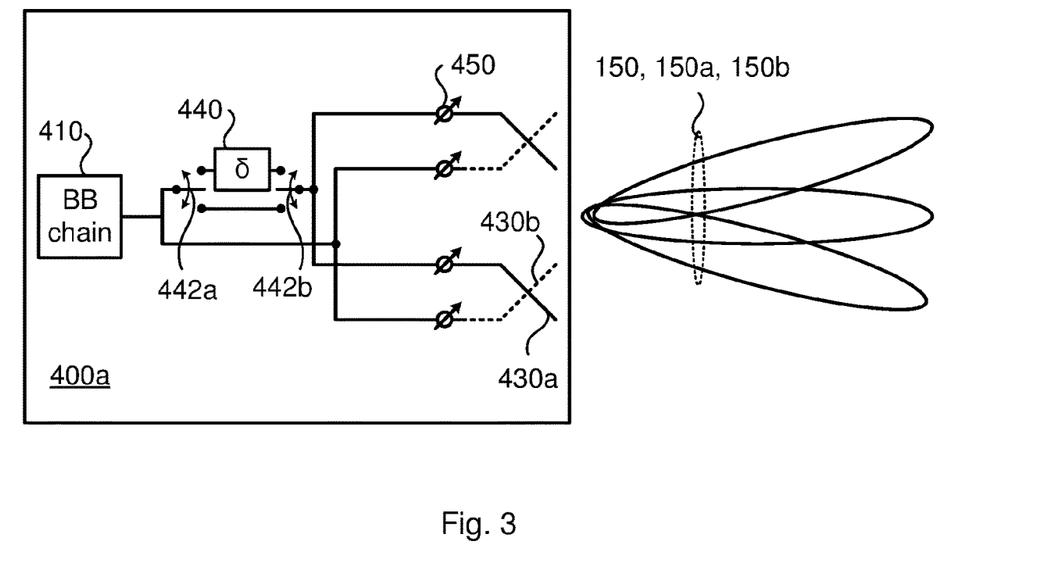
FIG. 3 schematically illustrates a transmission and reception point according to an embodiment.

In some aspects the change of polarization over the frequency interval is caused by a time delay value, hereinafter denoted $\delta$. That is, according to an embodiment the reception of the reference signal at the first antenna element set 430a and the second antenna element set 430b differ by a time delay value $\delta$. The time delay value $\delta$ causes the frequency-dependent polarization over the first frequency interval. The time shift caused by the time delay value $\delta$ will result in a frequency-dependent phase offset between the antenna elements of the two polarizations and thus the total polarization will change over frequency. That is, the time delay value δ causes the frequency-dependent polarization to occur over the frequency interval. The time delay caused by the time delay value δ is implemented in the time delay elements 440.

FIG. 3 illustrates a TRP 400a of radio transceiver device 200a according to an embodiment.

The TRP 400a of FIG. 3 comprises one single baseband chain 410 operatively connected to an antenna array with a first antenna element set 430a and a second antenna element set 430b via an analog distribution network comprising a time delay component 440 and phase shifters 450 (and optional power amplifiers, not shown). According to an embodiment the reference signal is received using analog beamforming and is provided to a single baseband chain 410. According to an embodiment the first antenna element set 430a has a first polarization and the second antenna element set 430b has a second polarization, as in FIG. 3. This is not to be confused with that the reception beam 150, 150a, 150b has a frequency-dependent polarization over the frequency interval.

In some aspects the time delay value δ is implemented by the time delay component 440. Particularly, according to an embodiment, the time delay value δ is implemented in a time delay component 440 where the time delay component 440 is operatively connected between the baseband chain 410 and all antenna elements of either the first antenna element set 430a or the second antenna element set 430b (but not both).

The time delay component 440 is operatively connected to (thus activated), and disconnected from (thus deactivated), the signal path between the baseband chain 410 and all antenna elements of either the first antenna element set 430a or the second antenna element set 430b by means of switches 442a, 442b. In the illustrative example of FIG. 3, when both switches are in the upper position, the time delay component 440 is activated, and when both switches are in the lower position, the time delay component 440 is deactivated. The time delay component 440 is preferably only activated during beam management.

Examples of components that can be used to implement the time delay component 440 are delay lines based on bulk acoustic waves (BAWs) or surface acoustic waves (SAWs) techniques. As noted above, the antenna array comprises a first antenna element set 430a and a second antenna element set 430b both connected to the same baseband chain. The TRP 400a of FIG. 3 is thereby capable of simultaneously creating only one single reception beam 150, 150a, 150a (where the reception beam can be seen as an aggregation of two sub-beams, where each sub beam is generated from one of the two antenna element sets) at a time. According to an embodiment the reference signal is thus received using analog beamforming and at a single baseband chain 410.

As disclosed above, in some aspects radio transceiver device 200a determines a preferred polarization state to be used during the coming data transmission/reception. In some aspects the frequency-dependent polarization in the first frequency interval at which the reference signal was received with highest received power defines this (preferred) polarization state. Radio transceiver device 200a might then be configured to use this polarization state for coming data transmission/reception. Particularly, according to an embodiment radio transceiver device 200a is configured to perform (optional) steps S106 and S108:

S106: Radio transceiver device 200a determines a set of phase adjustment settings corresponding to the (preferred) polarization state.

S108: Radio transceiver device 200a applies the set of phase adjustment settings to the phase shifters 450 of radio transceiver device 200a.

In some aspects it is thus assumed that radio transceiver device 200a is involved in data transmission/reception. Particularly, according to an embodiment radio transceiver device 200a is configured to perform (optional) step S110:

S110: Radio transceiver device 200a receives data and/or a control signal from radio transceiver device 200b. The data and/or a control signal occupies time/frequency resources that extend over a second frequency interval. The second frequency interval might wholly or partially overlap with the first frequency interval in which the reference signal is received.

During data transmission/reception the time delay component 440 is preferably deactivated. Thus, according to this embodiment the data and/or a control signal is received in a reception beam 150, 150a, 150b having a frequency-independent polarization over the second frequency interval. Instead the preferred polarization state is used during the coming data reception. That is, according to an embodiment the set of phase adjustment settings is applied when receiving the data and/or a control signal from said another radio transceiver device 200b.

There could be different antenna configuration that might be used when receiving the reference signal.

In some aspects the reference signal is received in at least two RX beams 150, 150a, 150b. Particularly, according to an embodiment each of the at least two reception beams 150, 150a, 150b has a frequency-dependent polarization over the first frequency interval. This is achieved by having the time delay component 440 operatively connected between the baseband chain 410 and all antenna elements of either the first antenna element set 430a or the second antenna element set 430b, as in the TRP 400a of FIG. 3.

There could be different ways to select the time delay value δ. In some aspects the time delay value δ is a function of the total requested phase shift in radians of the polarization over the frequency interval. In more detail, a phase shift of $2\pi$ over the frequency interval will result in all possible polarization states, i.e. one cycle, given equal power per polarization. The relation between the total phase shift α over the frequency interval, the frequency interval B and the required time delay value δ is according to an embodiment given by Equation (1):

$$\alpha = 2\pi \cdot B \cdot \delta \quad (1)$$

That is, according to an embodiment the time delay value δ is determined according to $\delta = \alpha/(2\pi \cdot B)$, where B is the frequency interval in Herz, and α is the total phase shift in radians of the polarization over the frequency interval B.

According to an embodiment $\alpha \geq 2\pi$ so as to ensure that all possible polarization states are traversed across the frequency interval. For example, a frequency interval of 10 MHz and a phase shift of $2\pi$ requires a time offset of δ=0.1 μs, corresponding to approximately 10% of the cyclic prefix, assuming an OFDM scale factor of 5 (where OFDM is short for orthogonal frequency-division multiplexing), as used in some 5G telecommunications systems.

Further aspects of how the polarization is changed over the frequency interval will now be disclosed.

Figure 4:
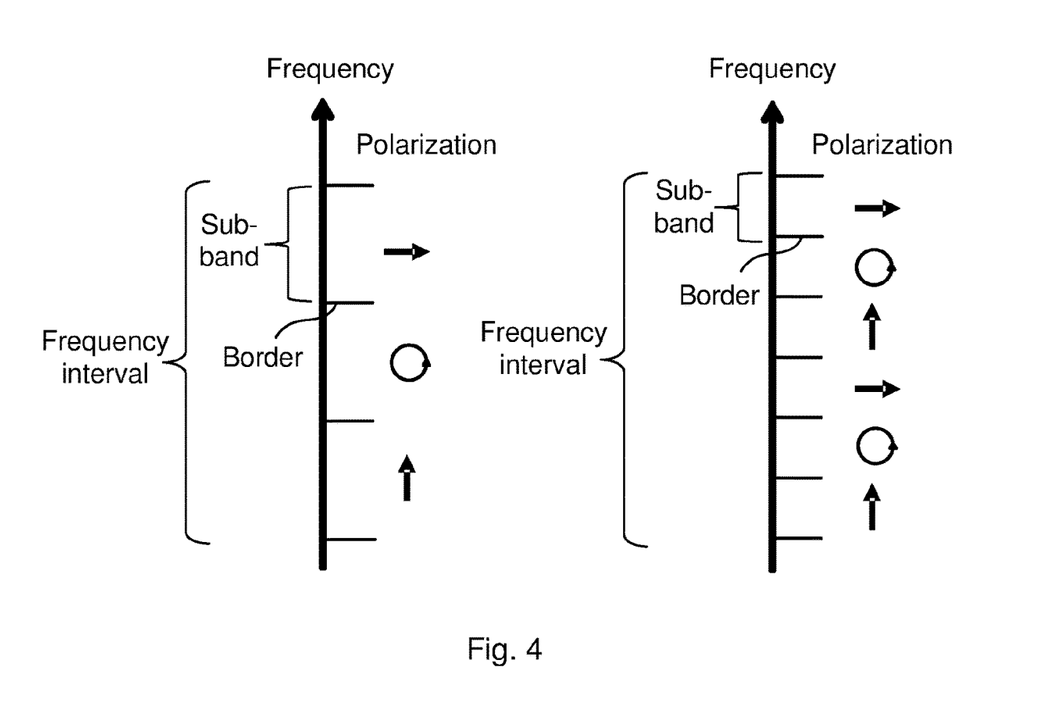
FIG. 4 schematically illustrates polarization as a function of frequency according to an embodiment.

Reference is made to FIG. 4, schematically illustrating polarization as a function of frequency according to two illustrative examples.

In some aspects the polarization changes over frequency sub-bands, where each sub-band has a polarization that differs within values in its own interval. How much the polarization changes within a particular sub-band generally depends on the width of the sub-band as well as the rate at which the polarization changes as a function of frequency (e.g. as caused by the time delay value δ). Particularly, according to an embodiment the frequency interval is divided into at least two frequency sub-bands, and the polarization changes between two neighbouring frequency sub-bands. In FIG. 4 each sub-band has one polarization. Any type of polarizations, such as linear, elliptic, and/or circular, or combinations thereof could be used to maximize diversity.

As disclosed above, in an embodiment it is determined at which frequency-dependent polarization in the first frequency interval the reference signal was received with highest received power. In this respect, one value of the received power can be calculated for each sub-band and thus the sub-band with highest received power be found. The preferred polarization state to be used during the coming data transmission/reception might then be determined as the value of the polarization in the middle of the sub-band with highest received power.

In some aspects, as in the right-hand example of FIG. 4, the time delay value is made so large that all different polarization states are recurring several times within the frequency interval. This could typically be the case where the frequency interval is several hundreds of MHz long, as might be expected at mmWave frequencies. In this way a reliable preferred polarization state can be determined, because then the different polarization states can be evaluated at many different frequencies.

In some aspects the coherency bandwidth is estimated and the sub-band size is based at least partly on this estimate. Where to place borders between each pair of neighbouring frequency sub-bands might then depend on the coherence bandwidth. Generally, the smaller the sub-band is, the better the diversity will be. However, if the sub-band becomes smaller than the coherency bandwidth, the processing gain can be negatively affected, which can decrease the link budget. Hence, when determining the sub-band size there is a trade-off between diversity and link budget, which depends on the coherency bandwidth.

There could be different types of reference signals. Which reference signal to transmit (and hence for radio transceiver device 200a to receive) might depend on which type of radio transceiver device 200b is transmitting the reference signal.

According to an embodiment the reference signal is a CSI-RS, or is defined by a synchronization signal (SS) block. This could be a typical case where radio transceiver device 200b is a network node and radio transceiver device 200a is a terminal device.

According to an embodiment the reference signal is a sounding reference signal (SRS). This could be a typical case where radio transceiver device 200b is a terminal device and radio transceiver device 200a is a network node.

There could be different ways to generate beams of different widths. For example, by applying principles disclosed in document WO2011/050866A1 it is, for example, possible to generate as wide beam widths (for the reception beams 150, 150a, 150b) as the antenna element beam width, regardless of how many antenna elements there are in the antenna array, thus resulting in dual-polarization beamforming. Dual-polarization beamforming can thus be used to selectively widening or narrowing reception beams 150, 150a, 150b as needed. Hence, principles disclosed in document WO2011/050866A1 can be applied to the TRP 400a in order to generate the reception beams 150, 150a, 150b. Other examples of principles that could be used to generate reception beams 150, 150a, 150b with beam widths as needed are based on optimizing complex weights of the antenna array or by muting some antenna elements of the antenna array. A way to generate wide (as well as narrow) reception beams 150, 150a, 150b with phase shifts only is by means of the array expansion technique described in WO2016141961 A1. WO2016141961 A1 relates to beam forming using an antenna array comprising dual polarized elements.

According to an embodiment the reception beam 150, 150a, 150b has a beam width that depends on which type of reference signal is to be received in the reception beam 150, 150a, 150b. As a non-limiting example, since an SS block might be transmitted using wider beams than a CSI-RS, radio transceiver device 200a when receiving an SS block might use more narrow reception beams that when receiving CSI-RS.

The beam management might be performed periodically, semi-persistently or aperiodically (for example when being event triggered), and thus the reference signal might be transmitted periodically, semi-persistently or aperiodically.

Beam management might be generally performed before data communication, to set up proper beam pair link(s). For longer data sessions, the beam pair links might need to be updated in order to enable continued communications. In this latter case, beam management and data communications might be alternating. In some aspects radio transceiver device 200a thus already has an established connection with radio transceiver device 200b when step S102 is performed and the beam management is for continued communications.

Figure 5:
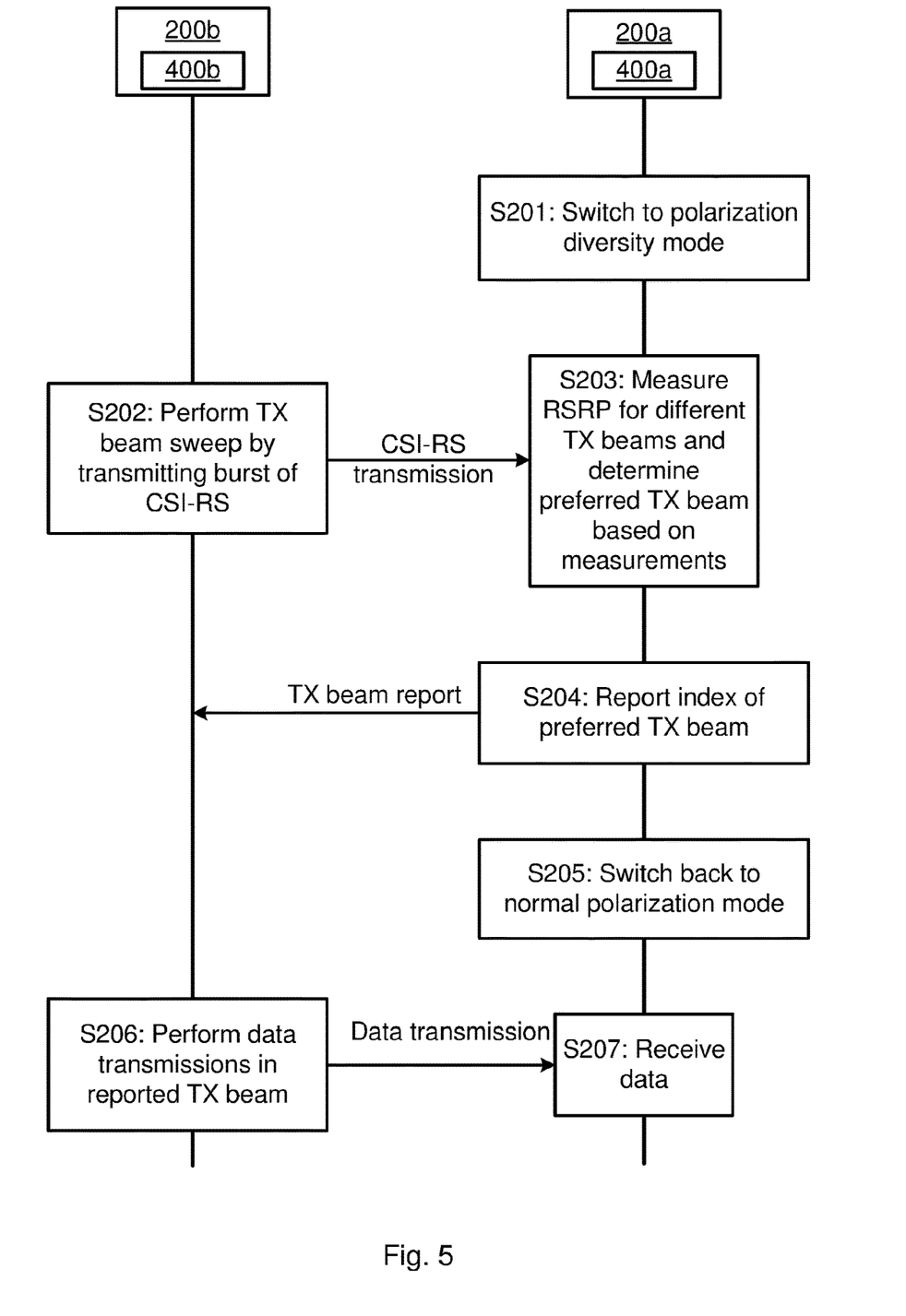
FIG. 5 is a signalling diagram according to an embodiment.

One particular embodiment for participating in beam management as performed by radio transceiver devices 200a, 200b will now be disclosed with reference to the signalling diagram of FIG. 5. In FIG. 5 radio transceiver device 200a is embodied as a terminal device and radio transceiver device 200b is embodied as a network node.

S201: Radio transceiver device 200a switches to a polarization diversity mode, for example by activating the time delay component 440 (with both switches 442a, 442b up in FIG. 3).

S202: Radio transceiver device 200b performs a transmission beam sweep whilst transmitting CSI-RS. A burst of CSI-RS is thus transmitted in different transmission beams.

S203: Radio transceiver device 200a receives the CSI-RS and performs RSRP measurements over the whole frequency band. Radio transceiver device 200a further determines which of the transmission beams was received with highest RSRP, thus determining the best transmission beam.

S204: Radio transceiver device 200a reports the index to the thus best transmission beam to radio transceiver device 200b.

S205: Radio transceiver device 200a switches to normal polarization mode, for example by deactivating the time delay component 440 (with both switches 442a, 442b down in FIG. 3).

S206: Radio transceiver device 200b transmits data towards radio transceiver device 200a using the reported best transmission beam.

S207: Radio transceiver device 200a receives the data.

Figure 6:
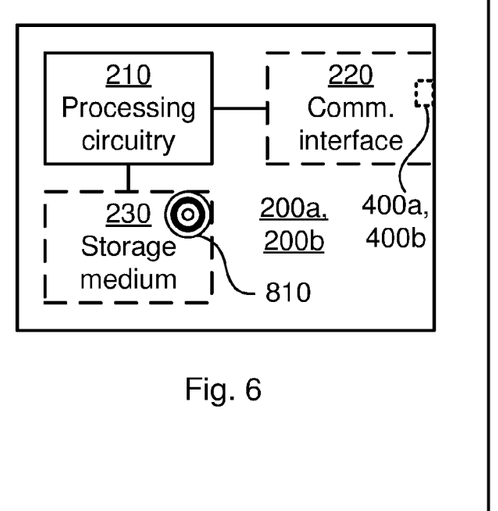
FIG. 6 is a schematic diagram showing functional units of a radio transceiver device according to an embodiment.

FIG. 6 schematically illustrates, in terms of a number of functional units, the components of a radio transceiver device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause radio transceiver device 200a to perform a set of operations, or steps, S102-S110, as disclosed above. For example, the storage medium 230 may store the set of operations, and the processing circuitry 210 may be configured to retrieve the set of operations from the storage medium 230 to cause radio transceiver device 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Radio transceiver device 200a may further comprise a communications interface 220 at least configured for communications with communications with another radio transceiver device 200b. As such the communications interface 220 may comprise one or more transmitters and receivers, comprising analogue and digital components. Signals, such as reference signals as well as data signals, could be transmitted from, and received by, a TRP 400a of radio transceiver device 200a. The TRP 400a could form an integral part of radio transceiver device 200a or be physically separated from radio transceiver device 200a. The communications interface 220 might thus optionally comprise the TRP 400a.

The processing circuitry 210 controls the general operation of radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of radio transceiver device 200a are omitted in order not to obscure the concepts presented herein.

Figure 7:
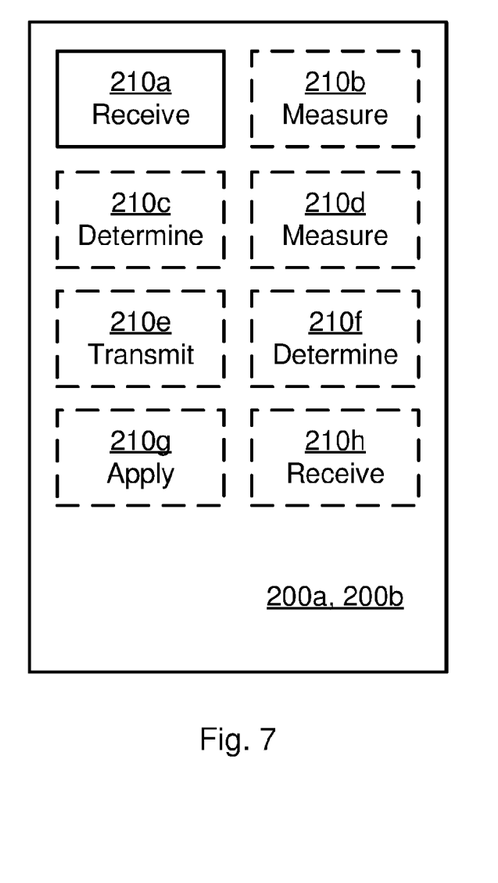
FIG. 7 is a schematic diagram showing functional modules of a radio transceiver device according to an embodiment.

FIG. 7 schematically illustrates, in terms of a number of functional modules, the components of a radio transceiver device 200a according to an embodiment. Radio transceiver device 200a of FIG. 7 comprises a receive module 210a configured to perform step S102. Radio transceiver device 200a of FIG. 7 may further comprise a number of optional functional modules, such as any of a measure module 210b configured to perform step S102a, a determine module 210C configured to perform step S102b, a measure module 210d configured to perform step S102C, a transmit module 210e configured to perform step S104, a determine module 210f configured to perform step S106, an apply module 210g configured to perform step S108, and a receive module 210h configured to perform step S110.

In general terms, each functional module 210a-210h may in one embodiment be implemented only in hardware and in another embodiment with the help of software, i.e., the latter embodiment having computer program instructions stored on the storage medium 230 which when run on the processing circuitry makes radio transceiver device 200a perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any steps as disclosed herein.

Radio transceiver device 200a may be provided as a standalone device or as a part of at least one further device. Examples of devices in which the functionality of radio transceiver device 200a might be provided have been given above with reference to FIG. 1.

A first portion of the instructions performed by radio transceiver device 200a may be executed in a first device, and a second portion of the of the instructions performed by radio transceiver device 200a may be executed in a second device; the herein disclosed embodiments are not limited to any particular number of devices on which the instructions performed by radio transceiver device 200a may be executed. Hence, the methods according to the herein disclosed embodiments are suitable to be performed by a radio transceiver device 200a residing in a cloud computational environment.

Therefore, although a single processing circuitry 210 is illustrated in FIG. 6 the processing circuitry 210 may be distributed among a plurality of devices, or nodes. The same applies to the functional modules 210a-210h of FIG. 7 and the computer program 820 of FIG. 8 (see below).

Figure 8:
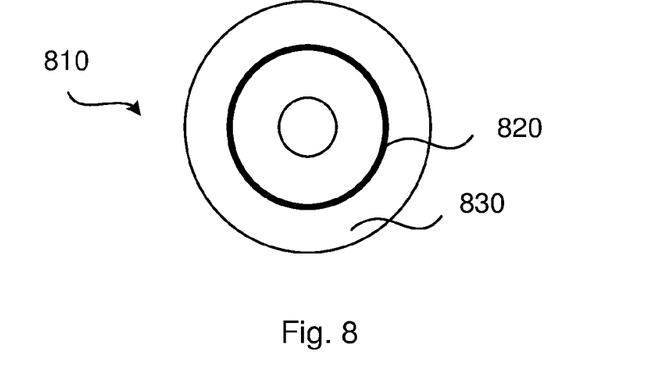
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for participating in beam management, the method being performed by a radio transceiver device, the method comprising:

receiving a reference signal from another radio transceiver device as part of participating in the beam management, wherein the reference signal occupies time/frequency resources that extend over a first frequency interval, wherein the reference signal is received in a reception beam, wherein the reception beam has a frequency-dependent polarization over the first frequency interval, and wherein the reference signal is received using a first antenna element set of a first polarization and a second antenna element set of a second polarization, the first and second antenna element sets providing the frequency-dependent polarization over the first frequency interval.

2. The method according to claim 1, wherein at least two occurrences of the reference signal are received in the reception beam, wherein each occurrence corresponds to a different transmission beam in which the reference signal is transmitted from said another radio transceiver device, the method further comprising:

measuring received power of each occurrence of the reference signal over the first frequency interval when receiving the reference signal.

3. The method according to claim 2, further comprising:

transmitting a report towards said another radio transceiver device, the report indicating which occurrence of the reference signal was received with highest received power.

4. The method according to claim 1, further comprising:

receiving data and/or a control signal from said another radio transceiver device, wherein the data and/or a control signal occupies time/frequency resources that extend over a second frequency interval, and wherein the data and/or a control signal is received in a second reception beam having a frequency-independent polarization over the second frequency interval.

5. The method according to claim 1, further comprising:

measuring received power of the reference signal over the first frequency interval when receiving the reference signal;

determining at which frequency-dependent polarization in the first frequency interval the reference signal was received with highest received power.

6. The method according to claim 5, wherein the frequency-dependent polarization in the first frequency interval at which the reference signal was received with highest received power defines a polarization state, the method further comprising:

determining a set of phase adjustment settings corresponding to the polarization state; and applying the set of phase adjustment settings to phase shifters of the radio transceiver device.

7. The method according to claim 4, wherein a set of phase adjustment settings is applied when receiving the data and/or a control signal from said another radio transceiver device.

8. The method according to claim 1, wherein the reference signal is received in at least two reception beams, and wherein each of the two reception beams has a frequency-dependent polarization over the first frequency interval.

9. The method according to claim 1, wherein reception of the reference signal at the first antenna element set and the second antenna element set differ by a time delay value $\delta$, the time delay value $\delta$ causing the frequency-dependent polarization over the first frequency interval.

10. The method according to claim 9, wherein the time delay value $\delta$ is determined according to $\delta = \alpha/(2\pi \cdot B)$, where B is the first frequency interval in Herz, and $\alpha$ is total phase shift in radians of the polarization over the first frequency interval B.

11. The method according to claim 10, wherein $\alpha \geq 2\pi$.

12. The method according to claim 9, wherein the time delay value $\delta$ is implemented in a time delay component, the time delay component being operatively connected between a baseband chain and all antenna elements of either the first antenna element set or the second antenna element set.

13. The method according to claim 9, wherein the reference signal is received using analog beamforming and is provided to a single baseband chain.

14. The method according to claim 1, wherein the first frequency interval is divided into at least two frequency sub-bands, and wherein the polarization changes between two neighbouring frequency sub-bands.

15. The method according to claim 1, wherein the radio transceiver device is a terminal device.

16. The method according to claim 1, wherein the reference signal is a channel state information reference signal, or is defined by a synchronization signal, SS, block.

17. The method according to claim 1, wherein the radio transceiver device is a network node, and wherein the reference signal is received at a transmission and reception point of the network node.

18. The method according to claim 1, wherein the reference signal is a sounding reference signal.

19. A radio transceiver device for participating in beam management, the radio transceiver device comprising processing circuitry, the processing circuitry being configured to cause the radio transceiver device to:

receive a reference signal from another radio transceiver device as part of participating in the beam management, wherein the reference signal occupies time/frequency resources that extend over a first frequency interval, wherein the reference signal is received in a reception beam, wherein the reception beam has a frequency-dependent polarization over the first frequency interval, and wherein the reference signal is received using a first antenna element set of a first polarization and a second antenna element set of a second polarization, the first and second antenna element sets providing the frequency-dependent polarization over the first frequency interval.

20. A computer program product for participating in beam management, the computer program product comprising computer program code, the computer program code comprised on a non-transitory computer readable medium which, when executed by processing circuitry of a radio transceiver device, causes the radio transceiver device to:

receive a reference signal from another radio transceiver device as part of participating in the beam management, wherein the reference signal occupies time/frequency resources that extend over a first frequency interval, wherein the reference signal is received in a reception beam, wherein the reception beam has a frequency-dependent polarization over the first frequency interval, and wherein the reference signal is received using a first antenna element set of a first polarization and a second antenna element set of a second polarization, the first and second antenna element sets providing the frequency-dependent polarization over the first frequency interval.

\* \* \* \* \*

UNITED STATES PATENT AND TRADEMARK OFFICE
CERTIFICATE OF CORRECTION

PATENT NO. : 10,911,127 B2
APPLICATION NO. : 15/751762
DATED : February 2, 2021
INVENTOR(S) : Nilsson Page 1 of 2

It is certified that error appears in the above-identified patent and that said Letters Patent is hereby corrected as shown below:

In the Specification

In Column 1, Line 63, delete "(where" and insert -- where --, therefor.

In Column 2, Line 27, delete "might preferred" and insert -- might be preferred --, therefor.

In Column 4, Line 32, delete "no." and insert -- 110. --, therefor.

In Column 6, Line 31, delete "interval)." and insert -- interval. --, therefor.

In Column 6, Line 44, delete "S102C:" and insert -- S102c: --, therefor.

In Column 6, Line 45, delete "S102C:" and insert -- S102c: --, therefor.

In Column 6, Line 48, delete "S102C" and insert -- S102c --, therefor.

In Column 7, Line 53, delete "sub beam" and insert -- sub-beam --, therefor.

In Column 8, Line 53, delete "Herz," and insert -- Hertz, --, therefor.

In Column 10, Lines 10-11, delete "beam forming" and insert -- beamforming --, therefor.

In Column 10, Line 19, delete "that when" and insert -- than when --, therefor.

In Column 11, Line 51, delete "210C" and insert -- 210c --, therefor.

In Column 11, Line 53, delete "S102C," and insert -- S102c, --, therefor.

In Column 12, Line 18, delete "of the of the" and insert -- of the --, therefor.

Signed and Sealed this
Fourth Day of January, 2022

Drew Hirshfeld
*Performing the Functions and Duties of the
Under Secretary of Commerce for Intellectual Property and
Director of the United States Patent and Trademark Office*

In the Claims

In Column 14, Line 3, in Claim 10, delete "Herz," and insert -- Hertz, --, therefor.